Feb. 28, 1950

B. S. TROTT 2,498,744

ANTENNA EQUALIZER

Filed Aug. 1, 1946

INVENTOR
BARNET S. TROTT
BY
Russell + Squire
ATTORNEYS

Patented Feb. 28, 1950 2,498,744

UNITED STATES PATENT OFFICE 2,498,744

ANTENNA EQUALIZER

Barnet S. Trott, Brooklyn, N. Y., assignor to Garod Radio Corporation, Brooklyn, N. Y.

Application August 1, 1946, Serial No. 687,547

8 Claims. (Cl. 250—33)

This invention relates to equalizing devices for the antennas of portable or similar radio receivers, and more particularly to receivers in which the antenna is capable of assuming a plurality of positions, one of which is in the proximity of the chassis of the receiver or near some other electrically conductive metallic object.

An object of the invention is to provide an equalizing device which will automatically compensate for the variation in the inductance and capacitance of the antenna of a portable or similar radio receiver when the antenna is in a position for compactness or convenience in carrying the receiver and which will maintain substantially the same inductance and capacitance when the antenna is moved to a different position to improve its sensitivity and responsiveness to weak signals.

A further object of the invention is to provide a device which will automatically maintain the same inductance and capacitance for the antenna, particularly from the standpoint of the receiver tuning condenser, under conditions in which the antenna is in close proximity to the receiver chassis and when it is elevated or removed from the chassis or carrying case in order to improve its responsiveness to weak signals. When the antenna is in proximity to the chassis, which is the position for greatest convenience in carrying the receiver, its inductance is lowered and its distributed capacitance is increased by reason of its proximity to electrically conductive portions of the receiver. In this position, it will usually be sufficiently sensitive to receive relatively strong signals from nearby transmitters and the performance of the receiver will be entirely adequate. When it is desired to receive weaker signals from more distant stations, as in instances where the receiver is being used in the country or other location remote from a transmitter, the sensitivity and overall performance of the receiver will be improved by raising the antenna. In cases where the receiver is to be used in a train, aeroplane, or other vehicle which is composed principally of metal, it is desirable to remove the antenna from the receiver case and place it on or near a window of the vehicle. In both of these latter two instances, the inductance of the antenna will be increased and its effective capacitance will be reduced when it is displaced from its compact lowered or carrying position which is, as shown at 2′ in Fig. 1, in proximity to the chassis or other electrically conductive parts of the receiver. With the antenna lowered, the compactness of the receiver is increased and the general appearance of the receiver is more pleasing to the eye. The placing of the antenna in the compact position necessarily changes the impedance presented by the antenna to the tuning condenser of the receiver. The invention, however, automatically compensates for this change in impedance and preserves the proper conditions for correct tracking of the antenna tuning section with respect to the other sections of the main receiver tuning condenser. By maintaining correct tracking, the full sensitivity of the receiver is retained, together with the full selectivity with respect to adjacent channel interference, with the antenna in either position. The normal image ratio is also retained, in the case of a receiver of the superheterodyne type, with the antenna in either position. It should be noted, that with the antenna raised or removed from the compact or carrying position, the receiver performance is improved by the improvement in the "Q" or loss factor of the antenna together with the placing of the antenna in a position of increased field strength.

Referring to the drawings.

Figure 1:
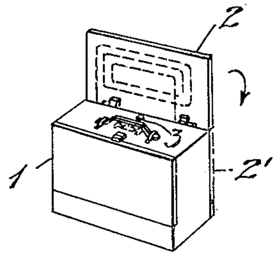
Fig. 1 shows an embodiment of the invention applied to a portable receiver in which the antenna may be raised or lowered.
Figure 4:
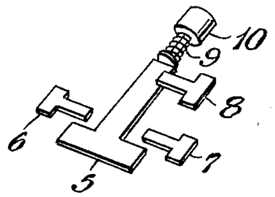
Figure 5:
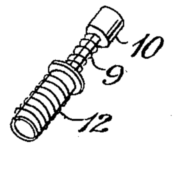
Fig. 5 illustrates a modification of the invention in which a slug-tuned coil with movable core is utilized.

Referring to Fig. 1, a portable radio receiver 1 is provided with a loop antenna 2 which is shown in its raised position but which may be lowered for convenience in carrying as indicated by the dotted lines at 2′. A device 3, such as a switch illustrated in Figs. 3 and 4 or a variable inductance as illustrated in Fig. 5 is located so that it will be mechanically actuated by the antenna when it is in its lowered position for carrying and will be restored by means such as a spring when the antenna is raised for the reception of weak signals.

Figure 2:
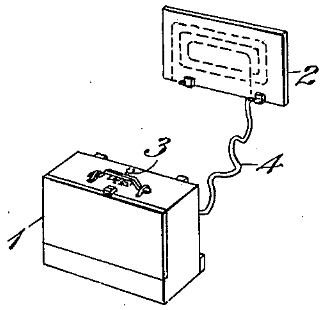
Fig. 2 shows an embodiment of the invention in which the antenna may be completely removed from the receiver case.

In Fig. 2, the antenna 2 may be completely removed from the receiver 1, connection being maintained by flexible cable of suitable design 4. The device 3 is so located that it will be actuated when the antenna is in position for carrying. The antenna 2 may be provided with fastening means such as rubber suction cups permitting it to be secured to the window of a train or other metallic vehicle when it is desired to use the receiver under such circumstances.

Figure 3:
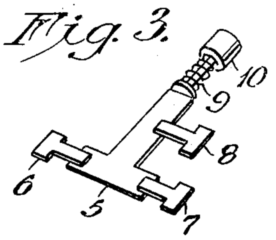
Figs. 3 and 4 show two positions of a switch used in practicing the invention.

Referring to Fig. 3, a switch which may be used in device 3 is shown in its non-actuated position as in Fig. 1 with the antenna raised or Fig. 2 with the antenna removed. Movable switch blade 5 is in engagement with stationary contact members 6, 7 and 8, actuating button 10 being urged outwardly by compression spring 9.

When the antenna 2 is lowered from its raised position shown at 2 in Fig. 1 or replaced from its removed position shown in Fig. 2, as the antenna comes into its carrying position indicated at 2', actuating button 10 is forced inwardly causing switch blade 5 to disengage stationary contact members 6 and 7.

With the modification of the invention illustrated in Fig. 5 the inductance of winding 12 is increased by the inward motion of a movable core when the antenna is lowered or replaced and the inductance is decreased when the antenna is raised or removed. Fig. 5 uses no moving contacts and is preferable for use when the change in capacitance of the antenna is sufficiently small so that no compensating capacitance is required. It should be noted that coil 12 has no appreciable mutual inductance with antenna 2.

Figure 6:
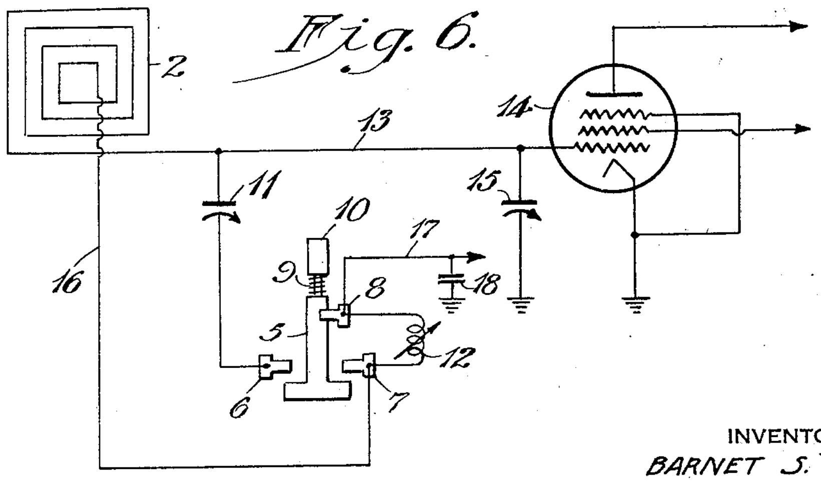
Fig. 6 is a circuit diagram of an embodiment of the invention.

In Fig. 6, the outer end of antenna 2 is connected by conductor 13 to the control grid of pentrode 14 which represents the first tube of the receiver. Antenna 2 is tuned by variable condenser 15 which may be one unit of the usual gang type tuning condenser ordinarily used in receivers. The other connections to pentode 14 may be of any desired or well known arrangement. The inner end of antenna 2 is connected by conductor 16 through coil 12 and conductor 17 to a suitable source of grid biasing potential which may be an automatic volume control circuit. From a radio frequency standpoint, conductor 17 is grounded through the action of bypass capacitor 18. Inductance 12 is proportioned to compensate for the change in inductance of the antenna between its raised and lowered positions and capacitor 11 is proportioned to compensate for the change in capacitance produced by the change in antenna position. Switch blade 5 is illustrated in the position which is occupies with the antenna lowered. Inductance 12 is in circuit to compensate for the decreased inductance of the antenna and capacitor 11 is disconnected since the antenna capacitance is at a maximum. When the antenna 2 is raised, switch blade 5 moves under the influence of compression spring 9 causing blade 5 to engage stationary contact members 6 and 7. This short-circuits inductance 12, removing it from the circuit and bridges capacitor 11 across the antenna circuit. The removal of inductance 12 from the circuit compensates for the increased inductance of the antenna and the bridging of capacitor 11 compensates for the decreased capacitance of the antenna when it is raised, removing it from proximity to the receiver chassis.

If the change in capacitance is sufficiently small so that its effect on the tuning of antenna 2 may be disregarded, then the desired change in inductance, required to offset the change in antenna inductance may be obtained by the use of a movable core in inductance 12, obviating the necessity of any moving contacts. This arrangement is illustrated in Fig. 5, the inductance of coil 12 being increased when the antenna is lowered.

While but one form of the invention has been shown and described herein, it will be readily apparent to those skilled in the art that many minor modifications may be made without departing from the spirit of the invention or the scope of the appended claims.

I claim:

1. In a radio receiver having metallic parts and an antenna circuit, an antenna movable to a plurality of positions, one of which is in proximity to the metallic parts, mechanically movable means actuated by moving the antenna into the last named position for increasing the effective inductance of the circuit of the antenna by an amount sufficient to compensate for the decrease in inductance when the antenna is in proximity to the metallic parts, said means comprising a circuit including an inductance coil, the coil having no appreciable mutual inductance with the antenna.

2. In a radio receiver having electrically conductive portions and a loop type antenna movable to a position in proximity to the electrically conductive portions for increasing the compactness of the receiver and movable away therefrom for improving the performance thereof, a device mechanically actuated to a first position by the antenna when the antenna member is moved to the compact position, and mechanically actuated to a second position when the member is moved away from the compact position, an inductor connected to the antenna circuit, a capacitor connected to the antenna circuit, and means responsive to movement of the device from its second to its first position arranged to render the inductor effective to increase the inductance of the antenna circuit and the capacitor effective to decrease the capacitance thereof by an amount sufficient to compensate for the decrease in the inductance and increase in capacitance of the antenna caused by moving the antenna to the compact position.

3. A radio receiver as in claim 2 in which the means responsive to movement of the device from its second to its first position comprises switch means arranged to connect the inductor effectively to the antenna circuit and substantially simultaneously effectively disconnect the capacitor therefrom.

4. A radio receiver as in claim 2 in which the capacitor is adjustable.

5. A radio receiver as in claim 2 in which the inductor is adjustable.

6. A radio receiver as in claim 2 in which both the capacitor and the inductor are adjustable.

7. In a radio receiver having electrically conductive portions and a loop type antenna movable to a position in proximity to the electrically conductive portions for increasing the compactness of the receiver and movable away therefrom for improving the performance thereof, a device mechanically actuated to a first position when the antenna is moved to the compact position, and mechanically actuated to a second position when the antenna is moved away from the compact position, an inductor connected to the antenna circuit, and means responsive to movement of the device from its second to its first position arranged to render the inductor effective to increase the inductance of the antenna circuit by an amount sufficient to compensate for the decrease in the inductance of the antenna circuit caused by moving the antenna to the compact position, the means responsive to movement of the device from its second to its first position comprising switch means arranged to connect the inductor effectively to the antenna circuit.

8. In a radio receiver having electrically conductive portions and a loop type antenna movable to a position in proximity to the electrically conductive portions for increasing the compactness of the receiver and movable away therefrom for improving the performance thereof, a device mechanically actuated to a first position when the antenna is moved to the compact position, and mechanically actuated to a second position when the antenna is moved away from the compact position, an inductor connected to the antenna circuit, and means responsive to movement of the device from its second to its first position arranged to render the inductor effective to increase the inductance of the antenna circuit by an amount sufficient to compensate for the decrease in the inductance of the antenna circuit caused by moving the antenna to the compact position, the means responsive to movement of the device from its second to its first position comprising a magnetizable core movably disposed within the inductor.

BARNET S. TROTT.

REFERENCES CITED

The following references are of record in the file of this patent:

UNITED STATES PATENTS

| Number | Name | Date |
|---|---|---|
| 1,901,025 | Franklin | Mar. 4, 1933 |
| 2,292,163 | Shea | Aug. 4, 1942 |
| 2,378,663 | Striker | June 19, 1945 |

FOREIGN PATENTS

| Number | Country | Date |
|---|---|---|
| 327,467 | Great Britain | Apr. 10, 1930 |

OTHER REFERENCES

Electronic Engineering, "A Resistance, Inductance and Capacitance Tester," page 162, Sept. 1943.